(12) United States Patent
Yu et al.

(10) Patent No.: US 7,209,912 B2
(45) Date of Patent: Apr. 24, 2007

(54) WIZARD AND HELP FILE SEARCH AND MANAGEMENT

(75) Inventors: Shuling Yu, Redmond, WA (US); Zhiqiang Mu, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 324 days.

(21) Appl. No.: 09/875,692

(22) Filed: Jun. 6, 2001

(65) Prior Publication Data

US 2002/0188612 A1  Dec. 12, 2002

(51) Int. Cl.
G06F 17/00 (2006.01)
G06F 7/00 (2006.01)
G06F 17/30 (2006.01)

(52) U.S. Cl. .................. 707/3; 707/100; 707/104.1

(58) Field of Classification Search .............. 707/1, 707/3, 100, 104.1
See application file for complete search history.

(56) References Cited

U.S. PATENT DOCUMENTS

| | | | | |
|---|---|---|---|---|
| 4,648,062 A | * | 3/1987 | Johnson et al. | 345/708 |
| 4,992,972 A | * | 2/1991 | Brooks et al. | 345/708 |
| 5,361,361 A | * | 11/1994 | Hickman et al. | 345/705 |
| 5,535,323 A | * | 7/1996 | Miller et al. | 715/707 |
| 5,758,331 A | * | 5/1998 | Johnson | 705/412 |
| 5,995,921 A | * | 11/1999 | Richards et al. | 704/9 |
| 6,003,063 A | * | 12/1999 | Wiley | 718/108 |
| 6,078,924 A | * | 6/2000 | Ainsbury et al. | 707/101 |
| 6,081,774 A | * | 6/2000 | de Hita et al. | 704/9 |
| 6,262,730 B1 | * | 7/2001 | Horvitz et al. | 345/707 |

OTHER PUBLICATIONS

*Dialog actions for natural language interfaces*; A. Jonsson; Proceedings of International Joint Conference on Artificial Intelligence; 1995, pp. 1405-1411 v2.
*Coding schemes for studies of natural language dialog*; L. Abrenberg, N. Dahlback and A. Jonsson; Empirical Methods in Discourse Interpretation and Generation; 1995, pp. 8-13.
*STAZ: Interactive software for undergraduate statistics*; V. Hatchette, A.R. Zivian, M.T. Zivian and R. Okada; Behavior Research Methods Instruments & Computers, 1999, v31, n1 (Feb), pp. 19-23.
*Interactive design methodology*; P. Harold and C. Merrill; Dr. Dobb's Journal, Jun. 1995, v20, n6, pp. 40, 42, 44-47, 98.
*WORLIC++ learning tool*; R.L. Brown, G.V. Carithers and A.M. Qasem; Proceedings of SEC '94. $32^{nd}$ Annual ACM Southeast Conference; 1994, pp. 213-216.
*Human-computer interface development: concepts and systems for its management*; H. Rex Hartson and Deborah Hix; ACM Comput. Surv. 21, 1 (Mar. 1989), pp. 5-92.

* cited by examiner

Primary Examiner—Apu Mofiz
Assistant Examiner—Cindy Nguyen
(74) Attorney, Agent, or Firm—Merchant & Gould

(57) ABSTRACT

A method and system are provided for searching and finding help files and wizards of computer operating systems and computer software applications that allow system administrators or users to quickly find the help file or wizard, invoke the help file or wizard, and execute the help file or wizard. Search keywords may be entered into a search dialog using a variety of different languages.

7 Claims, 5 Drawing Sheets

WIZARD AND HELP FILE SEARCH AND MANAGEMENT

TECHNICAL FIELD

The present invention generally relates to interactive help utilities. More particularly, the present invention relates to a method and system for searching and managing help and wizard utility functionality across a range of computer operating systems and computer software applications.

BACKGROUND OF THE INVENTION

Since the advent of computers, a variety of computer operating systems for operating and managing computer hardware components and for operating and allowing for the use of computer software applications have been developed. A large and growing number of separate computer software applications have followed the development of computer operating systems.

The increasing use of computer networks at homes, schools, and large and small businesses has created in many instances the situation in which a system administrator of a business or institution is required to maintain and configure a number of different computer operating systems. Additionally, system administrators and users in general are required to navigate through the functionality of a number of different computer software applications.

Many operating systems have interactive help files and so called "wizards." Wizards are interactive help utilities within an application or operating system that may be used to guide the user or administrator through steps of a particular task such as starting up an operating system, configuring the user management functions of an operating system, or starting up and using a computer software application, such as a word processing application.

In many cases help files and wizards are presented by operating systems and applications as graphical user interfaces that allow the user to ask for help and that guide the user through steps in obtaining help for a given task. However, because system administrators are often required to use and configure a number of different operating systems within a single network, and because users are often required to navigate the functionality of a number of different computer software applications, the task of learning the languages and functionalities of the different help files and wizards across a variety of operating systems and computer software applications becomes difficult and often unmanageable. Additionally, if the administrator or user speaks a different language than the native language of the operating systems or computer software applications, obtaining help from help files and/or wizards may not be intuitive to the administrator or user, and therefore may not be very useful.

It is with respect to these considerations and others that the present invention has been made.

SUMMARY OF THE INVENTION

In accordance with the present invention, the above and other problems are solved by a method and system for searching and managing help files and wizards of a variety of different operating systems and computer software applications that allow the system administrator or user to quickly find the help file or wizard, invoke the help file or wizard, and execute the help file or wizard in a variety of different languages.

More particularly, a method and system are provided for searching for a help utility (wizards and help files) including the steps of providing a plurality of help utilities and providing a utility search dialog. Search keywords directed to one of the plurality of help utilities are input into the search dialog. A database of the plurality of help utilities is searched to find a help utility matching one of the plurality of help utilities. After the help utility is found, it is invoked for use.

If more than one help utility is found during the search, all matches are displayed, and one help utility may be selected from the list. If after searching the database of the plurality of functions, no interactive help utility is found matching one of the plurality of help utilities, the search dialog is presented to allow additional searching.

These methods may be implemented as a computer process, a computing system or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and other features and advantages, which characterize the present invention, will be apparent from a reading of the following detailed description and a review of the associated drawings. It is to be understood that both the foregoing general description and the following detailed description are exemplary and explanatory only and are not restrictive of the invention, as claimed.

DETAILED DESCRIPTION OF THE INVENTION

In an exemplary embodiment of the present invention, a method and system are provided for searching, managing and invoking help files and wizards provided by a variety of different operating systems and computer software applications. The present invention may be understood more readily by reference to the following detailed description of the invention and the drawings.

In accordance with a preferred embodiment, wizards and help files are interactive help utilities within an application or operating system that may be used to guide the user or administrator through steps of a particular task such as starting up an operating system, configuring the user management functions of an operating system, or starting up and using a computer software application, such as a word processing application. Wizards and help files often are presented to the user in the form of one or more graphical user interfaces (GUI). According to an exemplary embodiment of the present invention, wizards or function wizards are utilized to obtain interactive assistance with functions within a variety of operating systems and software applications.

Figure 1:
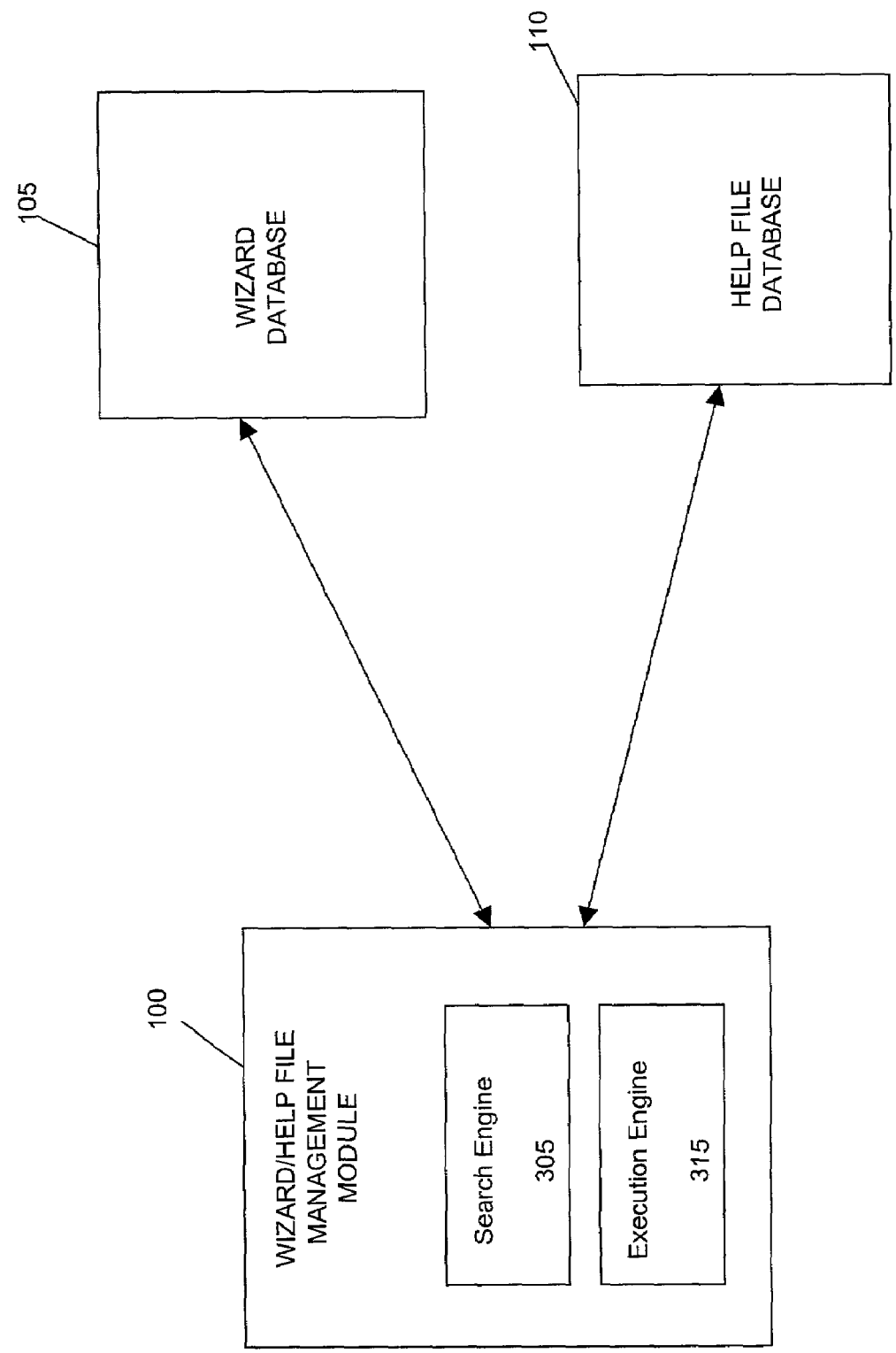
FIG. 1 shows a functional block diagram illustrating interaction between a wizard and help file search and management module and wizard and help file databases.

FIG. 1 shows a functional block diagram illustrating interaction between a wizard and help file search and management module 100 and wizard and help file data bases 105, 110. According to an exemplary embodiment, the wizard/help file module 100 is a program module that provides the functionality of searching for a variety of help files and wizards provided by a number of different operating systems and computer software applications.

As shown in FIG. 1, the wizard/help file management module 100 includes a search engine 305 and an execution engine 315. The wizard/help file management module 100 interacts with a wizard database 105 and a help file database 110 to locate wizards and help files for presentation to and execution by the user of the module 100. According to an exemplary embodiment of the present invention, the wizard database 105 and the help file database 110 include all available wizards and help files of the various operating systems being utilized by the network system administrator or user, as well as, the wizards and help files of the various computer software applications available to the user on the user's computer or via the user's network system.

According to an exemplary embodiment, the wizard database 105 and help file database 110 are specific to a given operating system or a specific computer software application. That is, each operating system has its own wizard/help file database, and each software application has its own wizard/help file database. When a search is performed for wizards/help files for a given operating system, the search is directed to the operating system wizard/help file databases, for example to locate a "user management" wizard. When a search is performed for wizards/help files for a given software application, the search is directed to the application wizard/help file database, for example to locate the "font setting".

Alternatively, each operating system may have a wizard/help file database that includes wizards and help files for the operating system and for all software applications being operated by the operating system. Accordingly, when a search is performed, the search may be utilized to locate a wizard or help file for the operating system and/or the software application to locate, for example, "word processor font setting," or "configure printer."

Alternatively, a wizard/help file database may include all wizards and help files of different operating systems that are connected in a network so that a search of the database yields wizards and help files across different operating systems and applications operated by those operating systems.

The wizard database 105 and the help file database 110 additionally include all configuration information, system information, operating system configurations and the names, descriptions, executive programs, paths and searchable keywords for wizards and help files available to the operating systems and computer software applications available to the user or to the system administrator according to the their network or individual computer. Accordingly, a system administrator of a network utilizing a number of different operating systems or a user utilizing a number of different computer software applications may use the functionality of the wizard/help file management module 100 to locate wizards and help files across the different operating systems and computer software applications available.

For example, if a system administrator is familiar with one operating system but is required to administer the services of four separate operating systems, the system administrator can invoke the wizard/help file management module 100 to search the wizard database 105 and help file database 110 to locate wizards and help files for one of the operating systems with which the administrator is inexperienced. If the system administrator would like to perform user management on a given operating system, for example, the system administrator may use the wizard/help file module 100 to locate a wizard or help file in that operating system to guide the user through a step-by-step process for performing user management according to the rules and policies for that operating system.

Likewise, a user of a variety of different software applications may use the functionality of the wizard/help file management module 100 to locate wizards or help files for different computer software applications to obtain assistance. For example, a user may be unfamiliar with the print records functionality of a given database management application. In accordance with an exemplary embodiment of the present invention, the user may use the wizard/help file management module 100 to locate an appropriate wizard or help file provided by the database management software application to assist the user in printing data records using the database management application.

Figure 2:
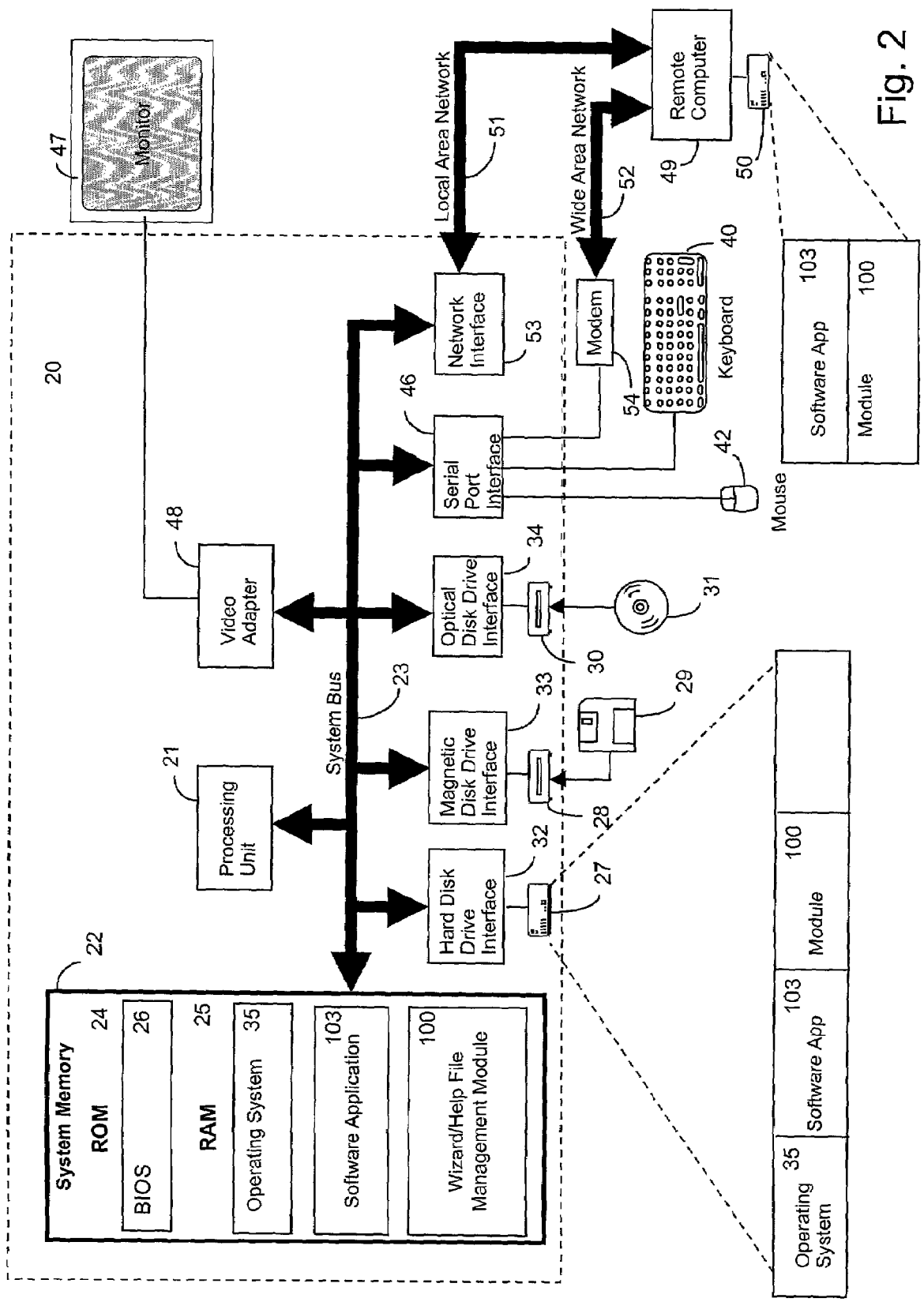
FIG. 2 illustrates a computer system that provides the operating environment for an exemplary embodiment of the present invention.

FIG. 2 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules.

Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 2, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media.

The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, a wizard/help file management module 100 and a software application 103. A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers 49. The remote computer 49 may be a server, a router, a peer device or other common network node, and typically includes many or all of the elements described relative to the personal computer 20, although only a memory storage device 50 has been illustrated in FIG. 2. The logical connections depicted in FIG. 2 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Computing device, such as personal computer 20, typically includes at least some form of computer readable media. Computer readable media can be any available media that can be accessed by personal computer 20. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by personal computer 20. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media. Computer readable media may also be referred to as computer program product.

Figure 3A:
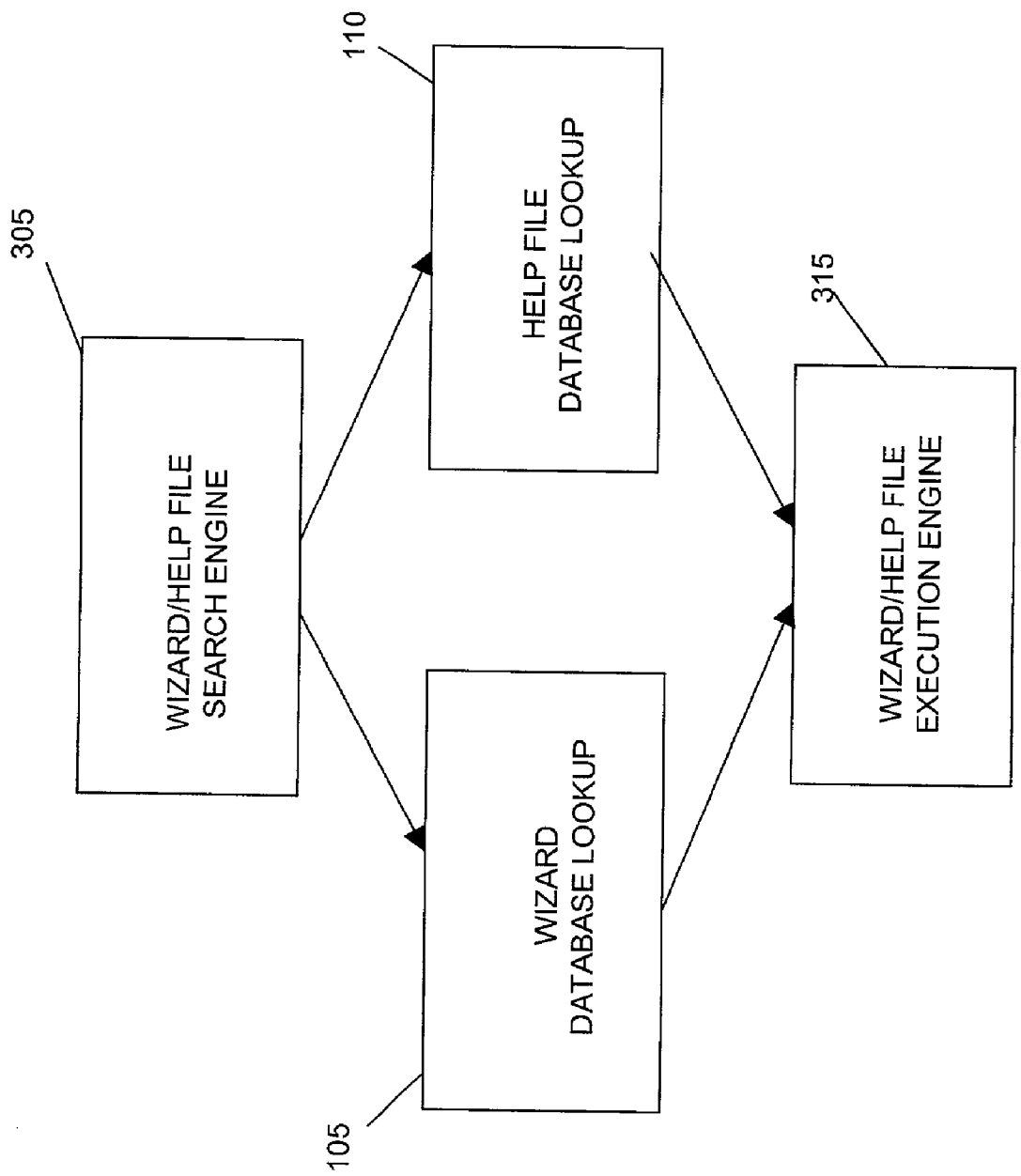
FIG. 3a shows a functional block diagram illustrating interaction between a search engine, wizard and help file databases, and a wizard/help file execution engine according to exemplary embodiment of the present invention.

FIG. 3a shows a functional block diagram illustrating interaction between a search engine 305, a wizard database 105, a help file database 110, and a wizard/help file execution engine 315 according to an exemplary embodiment of the present invention. The search engine 305 is invoked by the wizard/help file management module 100 to search the wizard database 105 and the help file database 110 for wizards and help files provided by a given operating system 35 or computer software application 103 to assist the user in utilizing or configuring the given operating system or software application.

Once a wizard or help file for the given operating system 35 or computer software application 103 is located by the search engine 305, the wizard/help file execution engine 315 invokes the wizard or help file via the name, description and path to the wizard or help file located in the wizard database 105 or help file database 110. After invoking the wizard or help file, the system administrator or user may then use the functionality of the wizard or help file to guide the system administrator or user in utilizing the functionality of the operating system or computer software application desired by the administrator or user.

Figure 3B:
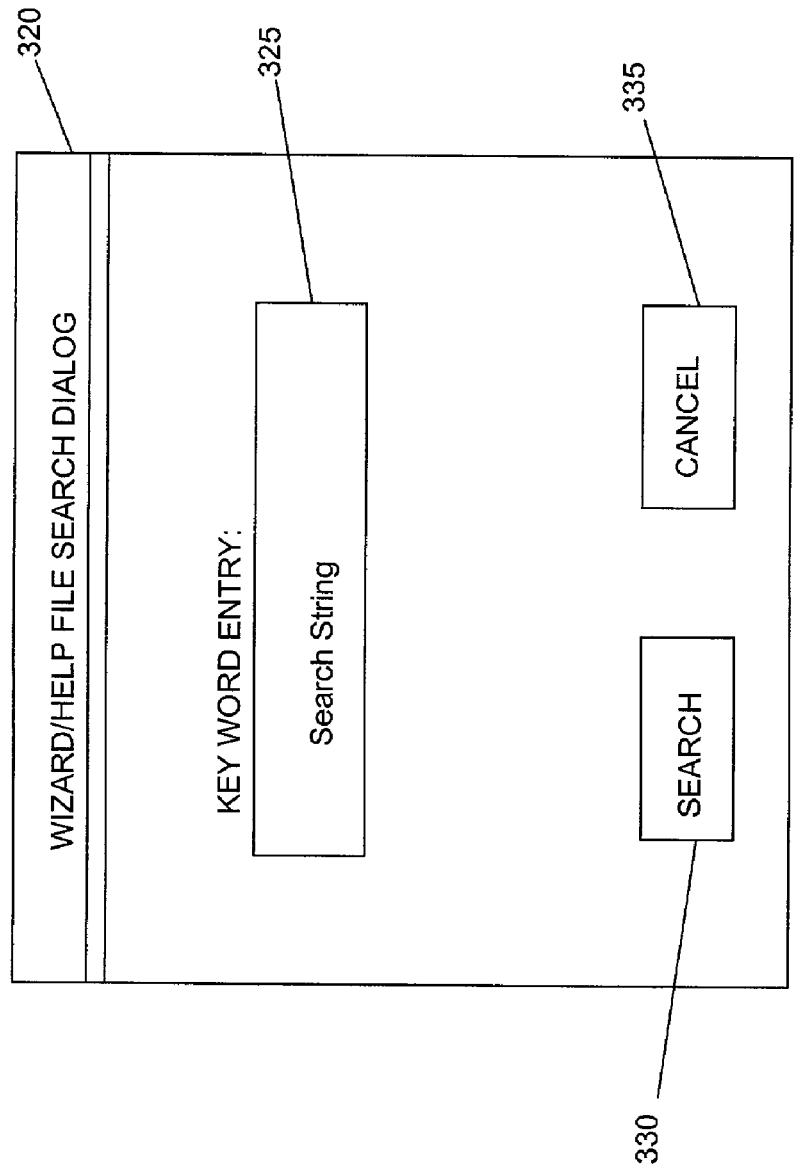
FIG. 3b depicts a screen shot of a search dialog box according to an exemplary embodiment of the present invention.

FIG. 3b depicts a screen shot of an exemplary graphical user interface for searching wizards and help files. According to a preferred embodiment, the wizard/help file search dialog 320 includes a keyword entry control 325, a search button 330, and a cancel button 335.

In order to initiate a search of the wizard database 105 and the help file database 110 by the search engine 305, as described above, the system administrator or user types a keyword string into the key word entry control 325 for locating an appropriate wizard or help file for use by the administrator or user. According to a preferred embodiment, the keywords are directed to functionality of a given operating system or software application with which the user needs assistance from a wizard or help file. Exemplary functionality of different operating systems embodied in a network system include for example, user management, peripheral device management, and the like. Exemplary functionality of different software applications include for example, print, copy, format, edit, and the like. For example, if the user wants to configure the hardware of a set of peripheral devices, such as printers connected to a network, via a given operating system, the user may enter a keyword string such as "hardware configuration" into the keyword entry control 325 and then select the search button 330. The search engine 305 performs a search of the wizard database 105 and help file database 110 for entries matching the keywords entered by the user. If a help file or wizard is found to match the keywords entered by the user, for example a wizard or help file for assisting with hardware configuration, that wizard or help file is invoked by the execution engine 315.

If more than one match is found, the user will be presented with all matches, and the user or system administrator can select one or more as necessary. If no match is found, the user is presented with any related wizards or help files, and the user is presented with the wizard help file search dialog 320 so that the user can input new keywords to refine the search. Alternatively, the user may select from the list of related wizards or help files, if desired.

Figure 4:
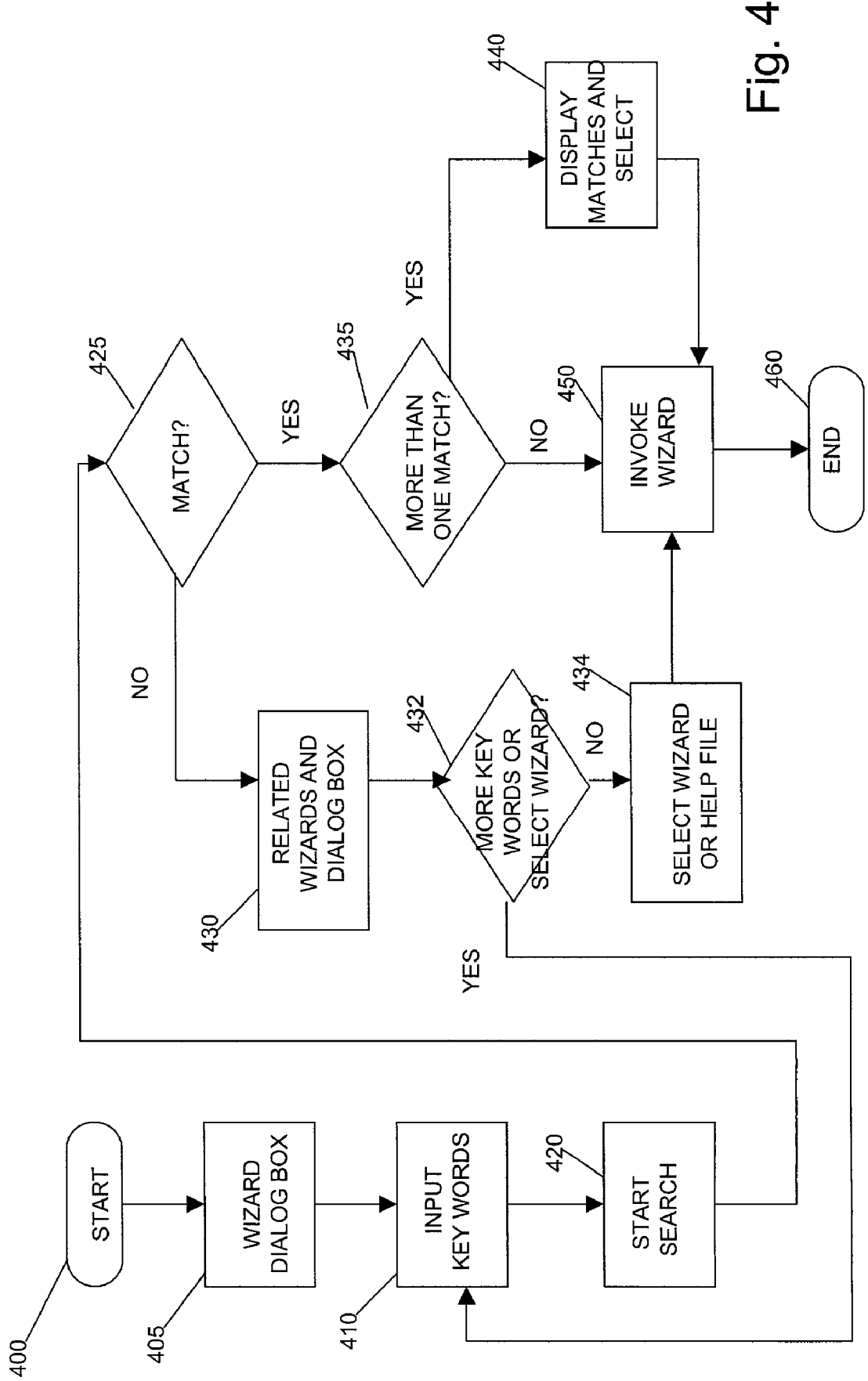
FIGS. 4 illustrates an exemplary method for searching, managing and executing help files and wizards according to an exemplary embodiment of the present invention.

FIG. 4 illustrates an exemplary method for searching, managing and executing help files and wizards according to the present invention. The following description of FIG. 4 is described with reference to logical steps illustrated in FIG. 4 and with reference to the exemplary search dialog, illustrated in FIG. 3b and the functional blocks illustrated and discussed with reference to FIGS. 1, 2 and 3a. For the sake of convenience, the logical flow illustrated in FIG. 4 is also described herein with reference to an example wherein a system administrator seeks the assistance of a wizard for assisting the system administrator in setting user permissions for allowing a group of users to access and utilize the hardware and software controlled by a given computer operating system.

Referring then to FIG. 4, the method begins at step 400 and moves to step 405 where the user invokes the wizard/help file search dialog 320 to locate a wizard to assist the system administrator in configuring the user permission settings for a given computer operating system 35. At step 410, the user is presented with the wizard/help file search dialog 320, illustrated in FIG. 3b, and the user inputs a keyword string into the keyword entry control 325. According to the present example, the user may enter keyword strings such as "user, permissions" or "user management" or "management of users" and the like.

In accordance with a preferred embodiment of the present invention, the search engine 305 of the wizard/help file management module 100 allows the user or system administrator to enter keywords in a number of different languages. It is advantageous to allow users and system administrators to enter keywords according to preferred spoken languages because a given user or system administrator may not be proficient enough with the language of the given operating system or computer software application 100 in order to formulate an appropriate keyword string to develop a good search.

After the user or system administrator enters the desired keywords at step 410, the method proceeds to step 420 where the system administrator initiates the search engine 305 by selecting the search button 330 illustrated in FIG. 3b. Upon initiation of the search engine 305, the wizard/help file management module 100, via the search engine 305, searches the wizard data base 105 and the help file database 110 for wizards and/or help files that match the keywords entered at step 410.

At step 425, a determination is made as to whether a matching wizard or help file has been located that matches the keywords entered by the system administrator. If at step 425, a matching wizard or help file is found, the method proceeds along the "Yes" branch to step 435 where a determination is made as to whether more than one matching wizard or help file is found. If at step 435, only one matching wizard or help file is found, the method proceeds along the "No" branch to step 450.

At step 450, the single matching wizard or help file is invoked by the execution engine 315 and the functionality of the wizard or help file is presented to the user for assistance in setting the user configurations for the desired operating system. As should be understood to those skilled in the art, the functionality of the invoked wizard or help file may be presented to the user through a variety of graphical user interfaces.

If at step 435 more than one matching wizard or help file is found corresponding to the keyword string entered by the user at step 410, the method proceeds along the "Yes" branch to step 440. At step 440, all matching wizards or help files are displayed to the system administrator or user, and the system administrator or user are allowed to select from the list of matching wizards or help files. The method then proceeds to step 450 and the selected wizard help file is invoked, as described above.

Referring back to step 425, if no matching wizards or help files are found to match the keyword string input at step 410, the method proceeds along the "No" branch to step 430. At step 430 any related wizards or help files that closely approximate the keywords input at step 410 are displayed to the user or system administrator for possible selection, and the user is presented with the wizard/help file search dialog 320 for input of additional keywords to refine the search. The method then proceeds to step 432 where a determination is made whether to select one of the listed related wizards or help files or to input more keywords. For example, if the system administrator wants to configure user permissions, but receives a related wizard for adding users to the network, the administrator may select that wizard to make some changes to the user list before the user returns to the task of setting user permissions.

If the user or administrator desires to input more keywords to refine the search, the method follows the "Yes" branch and proceeds back to step 410 where the system administrator or user is allowed to input additional keywords to refine or modify the search. However, if at step 432 the user or system administrator decides to select a wizard or help file from the list of related wizards or help files, the method proceeds to step 434 where the user or system administrator selects a wizard or help file from the list of related wizards or help files. The method then proceeds to step 450 where the selected wizard or help file is invoked, as described above.

It will be apparent to those skilled in the art that various modifications or variations can be made in the present invention without departing from the scope or spirit of the invention. Other embodiments of the invention will be apparent to those skilled in the art from consideration of the specification and practice of the invention disclosed herein. It is intended that the specification be considered as exemplary only, with a true scope and spirit of the invention being indicated by the following claims.

What is claimed is:

1. A computer-implemented method of searching for a help utility, comprising the steps of:

providing a utility search dialog rendered via an interface of a computer;

receiving via the interface input of one or more search keywords directed to at least one help utility;

searching a single database containing a plurality of help utilities received in the database from all of a plurality of different computer operating systems, wherein the plurality of help utilities are associated with the plurality of different operating systems and assist in maintaining and configuring the plurality of different computer operating systems wherein the plurality of help utilities comprises a plurality of help files and a plurality of wizards;

if after the step of searching the database containing the plurality of help utilities, a help utility is found matching the keywords, among the plurality of help utilities, executing the help utility wherein the plurality of help utilities comprises the plurality of help flies and the plurality of wizards;

if after the step of searching the database containing the plurality of help utilities, no help utility is found matching the keywords, then:
  providing the utility search dialog;
  inputting one or more additional keywords directed to at least one of the plurality of help utilities; and
  searching the database containing the plurality of help utilities,
  wherein the plurality of help utilities comprises a plurality of help files and a plurality of wizards; and
  wherein the plurality of help files and wizards are in a variety of different languages.

2. The method of claim 1, further comprising the steps of:
determining whether more than one help utility is found matching the keywords;
displaying all help utilities found to match the keywords; and
selecting one of all help utilities found to match keywords.

3. The method of claim 1, further comprising the steps of:
if after the step of searching the database containing the plurality, of help files and wizards, no help file and wizard are found matching the keywords but a related wizard that closely approximates the keywords is found, then displaying the related wizard; and
invoking the related wizard.

4. The method of claim 1, wherein the plurality of help utilities further include help utilities provided by a variety of computer software applications.

5. The method of claim 3, wherein each wizard is associated with one of the plurality of different computer operating systems.

6. The method of claim 3, wherein each help file is associated with one of the plurality of different computer operating systems.

7. The method of claim 1, wherein the search keywords may be input using a plurality of different languages according to preferred spoken languages.

* * * * *